Patented Mar. 6, 1934

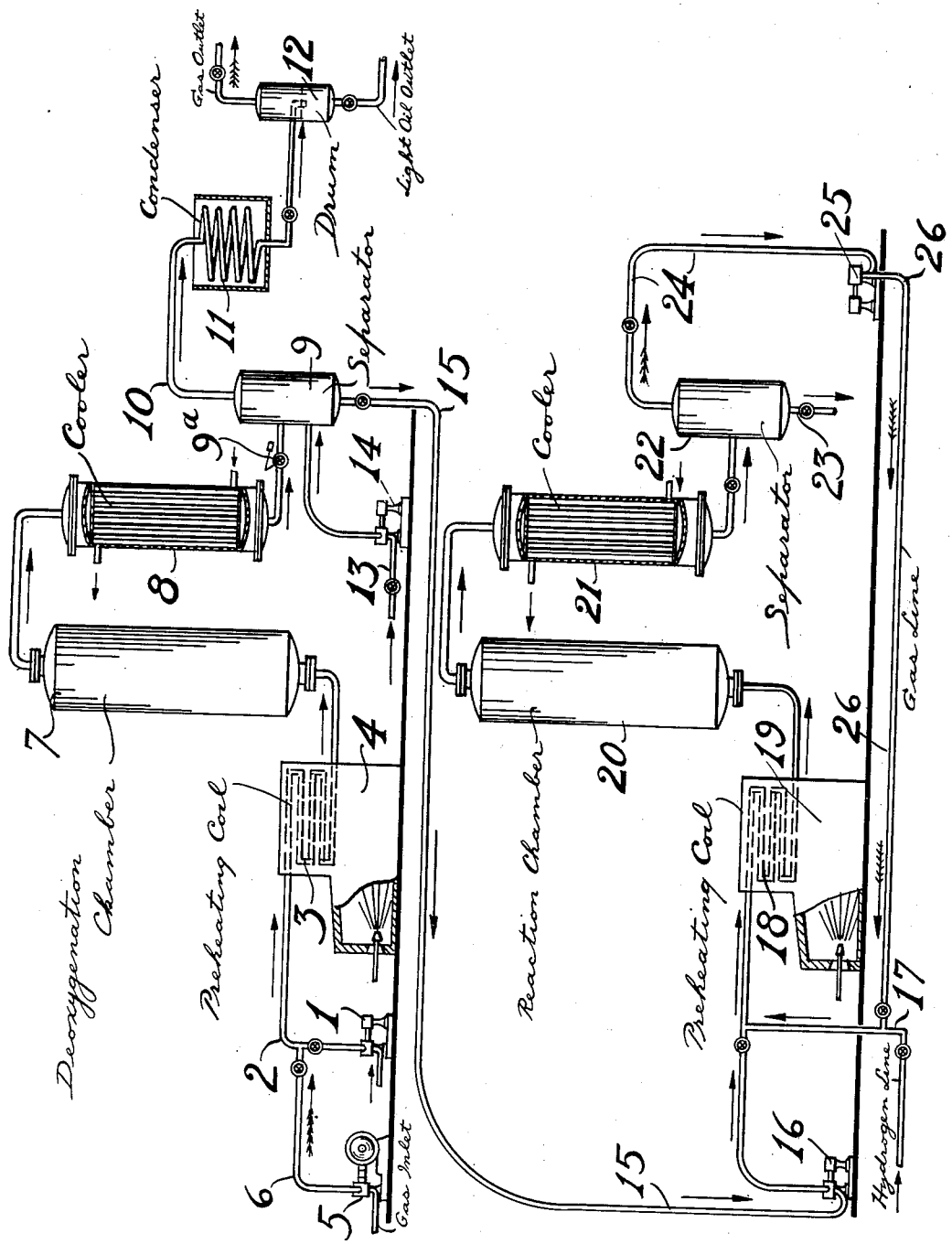

1,949,891

UNITED STATES PATENT OFFICE 1,949,891

PROCESS FOR THE MANUFACTURE OF VALUABLE PRODUCTS FROM COAL AND OTHER OXYGEN-CONTAINING CARBONACEOUS MATERIALS

Hein Israel Waterman, Delft, Netherlands, assignor to Naamlooze Vennootschap De Bataafsche Petroleum Maatschappij, The Hague, Netherlands Application June 16, 1930, Serial No. 461,628
In Great Britain June 24, 1929

10 Claims. (Cl. 196—53)

My invention relates to a process for the manufacture of valuable products from coal and other oxygen-containing carbonaceous materials and has as its principal object to convert coal, brown coal, cellulose and the like into more valuable products in an economical manner.

It is known to treat carbonaceous materials with hydrogen or gases or vapours containing hydrogen under pressure in order to convert the initial materials into valuable liquid products, such as benzine and kerosene.

It has also been proposed to replace the hydrogen by other reducing gases or gases which yield hydrogen under the circumstances of the reaction. So for instance carbonmonoxide alone or together with water vapour or hydrogen has been proposed as a hydrogenation gas for destructive hydrogenation.

Numerous proposals have been made for carrying out the said treatment, commonly known as destructive hydrogenation, which differ, for instance, in the nature of the catalyst used for facilitating the reaction or in the reaction temperature or in the pressure employed or in other reaction conditions, but all these prior proposals are alike to the extent that the originating materials are heated to a relatively high temperature in the presence of hydrogen or other reducing gases.

The chief drawback of the processes of such prior proposals is that they all require relatively large quantities of hydrogen, the production of which is somewhat expensive when prepared for use in such processes. Consequently, whatever beneficial technical effects said processes may have in general, they do not provide a solution of the problem of producing valuable liquid hydrocarbons from carbonaceous materials in an economical manner.

The process according to my invention provides means whereby this drawback may be overcome.

In studying destructive hydrogenation of carbonaceous materials of the above mentioned nature I have found a considerable part of the hydrogen used in the process is used up for combining with oxygen present in the initial materials and forming water therewith. That part of the hydrogen which combines with the oxygen present in the initial materials is in consequence wasted and only that part of the hydrogen which combines with the hydrocarbons formed during the reaction is utilized for the object in view.

I have now found a means whereby said drawback can be eliminated.

According to my invention the originating carbonaceous materials are first treated in the presence of carbonmonoxide or carbonmonoxide-containing gases at elevated temperature and preferably under pressure. Thereafter any lower boiling products which have been formed may be removed and then the mass which now is substantially free from oxygen is subjected to a second treatment in the presence of hydrogen or gases substantially consisting of hydrogen at elevated temperature and pressure for a further conversion into valuable liquid products. Suitable catalysts may be employed for facilitating the reaction in both of the stages. The carbon monoxide may be that obtained from any suitable source. Gases containing carbon monoxide, such as water gas or producer gas, may also be used. The oxygen present in the carbonaceous materials combines with the carbon monoxide, forming carbondioxide therewith. Part of the oxygen may also combine with the hydrogen present in the carbonaceous materials to form water therewith, which, with the carbon monoxide, yields hydrogen according to the equation:

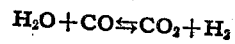
$$H_2O + CO \rightleftharpoons CO_2 + H_2$$

The hydrogen obtained in this way may serve for the hydrogenation of the carbon compounds, thereby yielding more valuable products therefrom.

Furthermore it frequently happens that the initial materials contain a certain quantity of water, which on heating is vapourized and combines with the carbon monoxide, as stated above. Sometimes it may even be advantageous to add water beforehand to the materials to be treated in order to increase the quantity of hydrogen originating from the reaction between carbon monoxide and water.

It will be understood that according to my invention the materials to be treated in the first stage are brought into a condition such that on further treatment with hydrogen they can be easily and economically converted into the desired final liquid products.

It should be observed, that when treating coal, browncoal, and the like solid oxygen-containing materials it is to be preferred to carry out the first stage with mixtures of carbonmonoxide and hydrogen and not with carbonmonoxide alone, but tars and other liquid oxygen-containing organic materials may also be advantageously treated with carbonmonoxide alone in the first stage.

Example 204 grams browncoal containing 9.2% ashes and 2.0% moisture are heated in an autoclave together with a mixture of 15.2 grams of a catalyst consisting of a mixture of simultaneously precipitated ferrichydroxide and aluminiumhydroxide, 20 grams of water and a mixture of hydrogen and carbonmonoxide in a ratio of 1:1 under an initial pressure of 100 kg/cm2. In 67 minutes the temperature in the autoclave is gradually raised from room-temperature to about 460° centigrade. Immediately thereafter heating is stopped and after the temperature of the mass is cooled to about 300° centigrade, the gaseous part of the products is withdrawn by release of pressure.

The yields were as follows calculated on dry and ashfree browncoal:

| | Percent |
|---|---|
| Hydrocarbon oil boiling below 220° centigrade | 9.6 |
| Hydrocarbon oil boiling between 220° and 300° | 7.6 |
| Cresolic substances boiling below 300° centigrade | 4.0 |
| Soft asphaltic residue | 38.0 |

From the following calculation it appears that the greatest part of the oxygen present in the coal in the form of oxygen compounds is removed in the form of $CO_2$.

At the beginning of the reaction 27.5 grams water were present (20 grams added as such, 4.1 grams present as moisture in the coal, 1.5 grams in the catalyst and about 2 grams formed out of the gases during the reaction). These 27.5 grams water correspond to 24.5 grams oxygen. Moreover 102.5 grams CO equivalent to 58.6 grams oxygen and 200 grams moisture-free browncoal containing 48.2 grams organically combines oxygen were present before the reaction. In total 131.3 grams oxygen. After the reaction 11.5 grams of water were obtained, equivalent to 10.2 grams oxygen. Moreover 41.1 grams CO equivalent to 23.5 grams oxygen and 120.0 grams $CO_2$ equivalent to 87.3 grams oxygen. In total 121.0 grams oxygen. It may be estimated that the residue contained about 5 grams of oxygen and the cresolic substances about 1.5 grams of oxygen. During the reaction 61.4 grams CO were consumed.

The following type of apparatus has been useful for carrying out the treatment. Coal tar or coal pasted in a liquid carrying medium such as tar, gas oil or the like, is forced by pump 1 through line 2 and the preheating coil 3, which is arranged in a furnace setting 4. A gas which may consist essentially of carbon monoxide is forced into the pipe 2 by means of a compressor 5 and line 6.

The preheated mixture passes from coil 3 to a deoxygenation chamber 7 adapted to withstand high pressure, and which may contain catalytic materials such as have been disclosed above. After passing through this chamber the products are cooled in a cooler 8 and are discharged into a separator 9, from which gases and vapors are removed by line 10 to a condenser 11 and a collection drum 12. In this drum any light oils produced in the deoxygenation are collected and may be removed to storage not shown. Carbon dioxide, carbon monoxide and permanent gases may also be separated.

Drum 9 is ordinarily maintained at a somewhat elevated temperature in order to accomplish the distillation of the lighter products from the deoxygenated residue and pressure may be released at a valve 9a. Where coal is treated it is especially advantageous to add an additional amount of liquid hydrocarbon material such as tars by means of line 13 and a pump 14 in order to flux the deoxygenated residue which is then passed to the destructive hydrogenation unit by line 15 and pump 16.

Hydrogen is admixed with the residue by means of line 17 and the mass is preheated in a coil 18 arranged in a furnace setting 19. The preheated mixture passes from the coil through the destructive hydrogenation reaction zone 20, is then cooled in a cooler 21 and discharges into a separator 22, from which liquid and solid residues are drawn off by a pipe 23. Permanent gases are taken from the separator by a pipe 24, and after purification (not shown) may be recirculated by a booster pump 25 and line 26.

The residue is now again treated with hydrogen under pressure, whereby it is converted, to a considerable extent, into lower boiling hydrocarbons.

It may be observed that since it appeared that carbon monoxide or a mixture of carbonmonoxide and other gases is very suitable for the removal of oxygen from carbonaceous materials the present process may also advantageously be applied to mixtures of coal or the like products and such oxygen-containing materials as normally only need a one-stage treatment for conversion into valuable liquid products substantially free from oxygen. Thus for instance the process according to my invention may be applied to a mixture of browncoal and phenols or cresols and the like. After the first stage the phenols or cresols are for the greater part converted into valuable cyclic hydrocarbons whereas the coal undergoes a conversion as illustrated in the example. The residue is then treated with hydrogen as described above.

What I claim is:

1. The process of manufacturing valuable hydrocarbon products from organic carbonaceous materials containing oxygen in addition to carbon and hydrogen which comprises treating said materials with gases essentially rich in carbon monoxide in an appropriate proportion, under conditions of temperature of the order of 460° C. and pressure of the order of 100 atmospheres and the appropriate time factor to cause an elimination of oxygen found in the initial materials through the oxidation of the carbon monoxide, and subjecting the substantially oxygen-free product to a second and separate treatment with a gas, and consisting substantially of hydrogen substantially free from carbonoxide under hydrogenating conditions to effect its conversion into valuable liquid hydrocarbon products.

2. An improved process for converting liquid and solid carbonaceous materials which contain oxygen as well as carbon and hydrogen to valuable lower boiling hydrocarbons which comprises first subjecting such material to deoxygenating treatment with a gas rich in carbon monoxide in a required proportion under conditions of elevated temperature and pressure and for a suitable time to cause the oxidation of the carbon monoxide, and then converting the deoxygenated material to lower boiling hydrocarbons by destructive hydrogenation using free hydrogen substantially free of carbon monoxide.

3. The process set forth in claim 2, wherein the carbon monoxide-containing gases of the first stage of the process include water gas.

4. The process set forth in claim 2, wherein the carbon monoxide-containing gases of the first stage of the process include producer gas.

5. The process set forth in claim 2, wherein the first stage of the process is carried out in the presence of water.

6. The process set forth in claim 2, wherein the initial carbonaceous materials include mixtures of solid oxygen-containing organic materials and liquid oxygen-containing organic materials.

7. The process set forth in claim 2, wherein the first stage of the porcess is carried out in the presence of a catalyst.

8. The process set forth in claim 2, wherein the second stage of the process is carried out in the presence of a catalyst.

9. The process set forth in claim 2, wherein the first stage of the process is carried out in the presence of a catalyst, and the second stage is carried out in the presence of a catalyst.

10. An improved process for obtaining valuable hydrocarbon products from carbonaceous materials containing oxygen in addition to carbon and hydrogen, which comprises first subjecting such material to a deoxygenating treatment with a suitable amount af carbon monoxide under conditions and for a time to cause the carbon monoxide to become converted to carbon dioxide essentially and then to destructive hydrogenation.

HEIN ISRAEL WATERMAN.